Aug. 14, 1951      F. MARINELLO      2,564,166
CIRCUIT AND VOLTAGE TESTING DEVICE
Filed Feb. 14, 1947
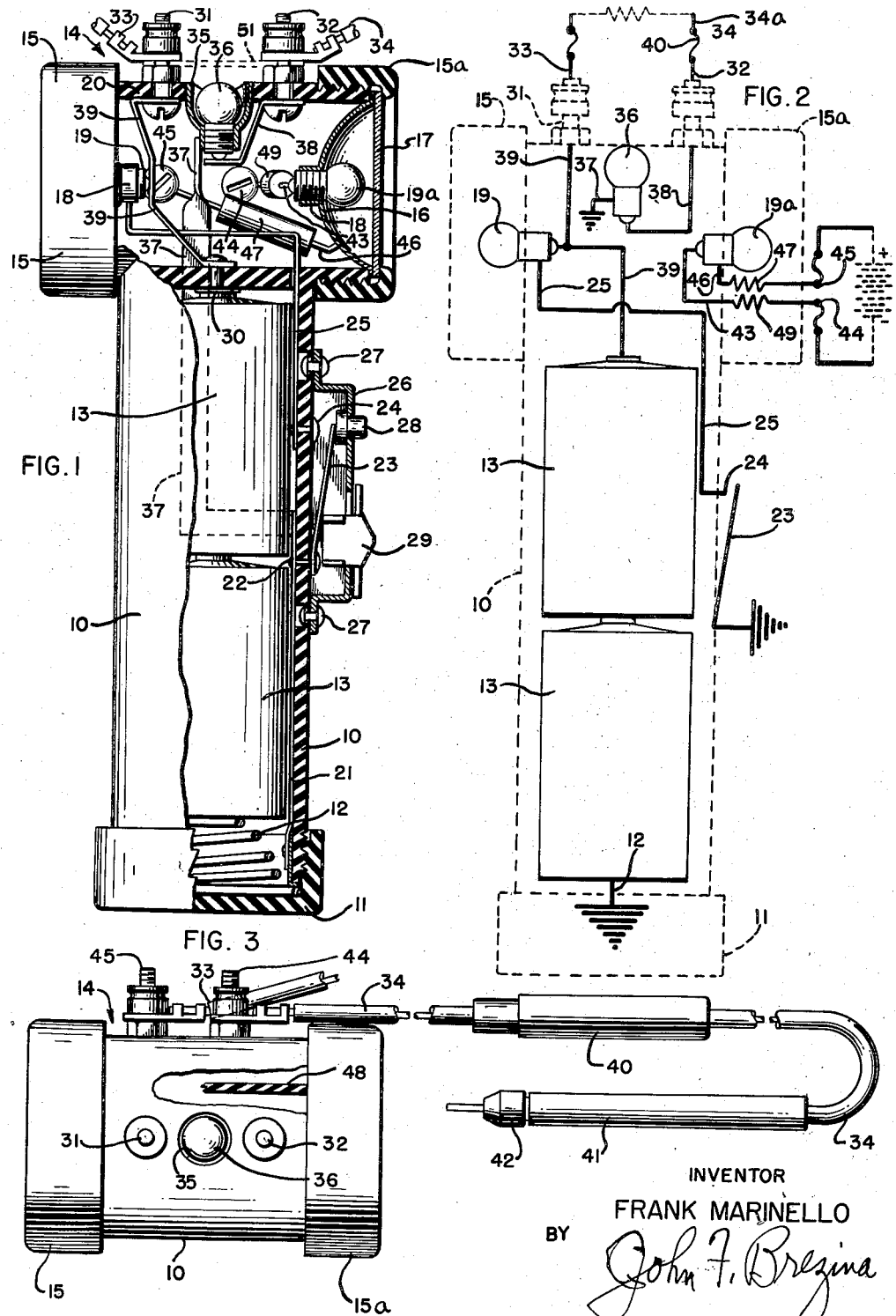
INVENTOR
FRANK MARINELLO
BY
John F. Brezina
ATTORNEY Patented Aug. 14, 1951

2,564,166

UNITED STATES PATENT OFFICE 2,564,166

CIRCUIT AND VOLTAGE TESTING DEVICE

Frank Marinello, Chicago, Ill.

Application February 14, 1947, Serial No. 728,534

1 Claim. (Cl. 175—183)

This invention is directed to novel portable devices adapted for testing electrical circuits and voltage.

An important object of my invention is the provision of a novel combination of structural cooperable elements which include flexible cable means and releasable terminals attached to a portable casing and which is electrically connected with the dry cell circuit, and which when applied to a conductive object will signal the closing of the circuit. Further objects include the combination of a battery cell housing, a signal light, a circuit connecting said signal light with the cell and with a cable terminal member, and a pair of testing cables having fuse elements interposed therein, being adapted to form part of the circuit to illuminate said signal light.

It is a further important object of my invention to provide a compact portable device which may be carried by electricians and others in a pocket or tool chest and which is adapted for use as a circuit tester as well as an illuminating means, both of which may have a common controllable circuit with the contained battery cells, and in which the same illuminating element may be selectively used either as a lighting element or as a signal to indicate a closed circuit through an object being tested.

Other and further important objects of my invention will be apparent from the following description and appended claim.

Fig. 1 is an elevation of my device with parts broken away to show parts in cross section and in elevation.

Fig. 2 is a diagrammatic view of the circuits.

Fig. 3 is an end view looking at the head of the unit and with parts broken away.

Referring to the drawing:

Numeral 10 designates an elongated casing, housing or shell, which is preferably cylindrical and formed of either metal, plastic or equivalent material. The lower end of said casing 10 is externally threaded and a removable end cap 11 is removably threaded thereon. A metal expansion spring 12 has one end seated in said cap 11 and its opposite end is adapted to normally press against the bottom of one of the battery cells 13. In the illustration of the drawing the casing 10 is formed of a plastic non-conductive material.

The opposite end portion of the casing 10 terminates in a head portion which is generally designated as 14. Such head portion 14 may extend either in one direction transversely of the casing 10 or may extend in any other direction as the positioning of the reflector and direct light medium is a matter of choice and equivalent. In the particular illustration of the drawing, I illustrate an optional double head whose externally threaded annular portions extend in opposite directions and which have threadingly mounted thereon flanged retaining rings 15 and 15a which removably mount rounded reflectors 16, (only one of which said reflectors is shown at the right of Fig. 1). Said rings also hold in place transparent lens 17 in the usual manner.

The centrally apertured reflectors 16 carry bulb sockets 18 in which conventional light bulbs 19 and 19a are threadingly mounted so that their inner terminal ends respectively project inwardly.

Said head 14 is partially defined by an annular integral end wall 20, shown in cross section in Fig. 1.

Referring to the right side of Fig. 1, a metal conductive strip 21 is disposed along the inside of the casing wall and one end thereof normally contacts the base of spring 12 and its other end extends to a pin or fastener 22 which extends through the casing wall and secures to said casing one end of a yieldable metal spring or switch arm 23 which is bent to normally hold itself out of contact with a contact terminal 24 which extends through the casing wall and secures one end portion of a metal circuit wire or strip 25 whose other end is electrically connected to the socket 18.

An apertured metal bracket 26 is secured to casing 10 by rivets or equivalent fastening elements 27. Said bracket 26 carries depressable contact button 28 which when depressed presses the spring switch 23 into circuit closing position. An optional slidable button 29 may be slidably mounted in a slot of said bracket 26 and is adapted to lock the switch in closed position.

The inner portion of the wall defining the head 14 has an aperture therein in which is mounted a contact element 30 which is normally in contact with the central terminal of the battery.

Secured by threaded units in two spaced apart holes in the wall 20 of head 14 are terminal screws or posts 31 and 32. Said posts 31 and 32 are adapted to have removably mounted thereon a pair of flexible insulated conductive cables 33 and 34 (only fragments of which are illustrated in Fig. 1).

A metal bar, strip or wire 39 electrically connects terminal post 31 and the inner terminal of bulb 19 and contact terminal 30.

Mounted in an opening in the wall 20 of the head 14 is a bulb socket 35 in which is threaded a conventional light bulb 36. Said socket 35 and bulb 36 may be varied as to positions with respect to the casing or head, it being understood that the drawing is illustrative of one embodiment of my invention. For example such socket and bulb may be mounted in the second head of the casing. A conductive bar or strip 37 is mounted along the inside of the casing 10 and it electrically connects the socket 35 with one side of the switch 23, preferably connecting with strip 21.

An offset angular metal contact member 38 has one end secured to the terminal post 32 and its inner end portion is disposed so that it is normally contacted by the inner central contact terminal of the bulb 36.

The posts 31 and 32 may be releasably connected with a movable shunt bar or switch arm which may, if so desired, be entirely removed. A portion of such arm is illustrated in Fig. 1. When it is not desired to use the bulb 36 as a selective illuminating means, such bar 51 may be disconnected from one of said posts 31 (or 32) and allowed to remain attached to the other of said posts for easy re-attachment as aforesaid. When such switch or shunt bar is removed from one of said posts, the cables 33 and 34 may be used for circuit testing as hereinbefore described.

Accordingly when the ends of the cables 33 and 34 are contacted to spaced apart points of a wire or other object whose circuit is to be tested, the closed circuit leads from the central terminal of the foremost battery cell through element 30, bar 39, post 31, cable 33, object being tested, post 32, contact bracket 38, bulb 36, contact bar 37, strip 21, spring 12 and end wall of battery cell. When the object being tested conducts the current therethrough, the bulb 36 will be illuminated. If said bulb is not illuminated when cables 33 and 34 are contacted to the object being tested, the user will know that such object is not contacting current through itself and that it is broken or faulty.

In Fig. 2, I have illustrated diagrammatically the aforesaid circuits.

By testing successive segments of an accessible circuit wire or other current conductor in the described manner, the user may easily locate the break or faulty section to permit repair or replacement thereof.

As circuit wires or equivalent electrical conductors to be tested carry currents of varying and substantial voltage, I provide fuses of the desired strength in the flexible cables 33 and 34. In Fig. 3, one of said fuses 40 is diagrammatically illustrated as interposed between cable 34 and a cable section 34a whose end portion is additionally insulated and preferably provided with a passaged non-conductive handle or gripping member composed of separable though connected sections 41 and 42 through which the cable section 34 extends. The outer end portion of the metal wire of the cable 34 is exposed so as to facilitate contact with the object being tested. Cable 33 (only a fragment of which is shown) is preferably similarly equipped with an interposed fuse similar to 40 and with a gripping member such as 41, 42.

As diagrammatically illustrated in Fig. 2 and as partially shown in Fig. 1, the central contact member of bulb 19a is electrically connected by a metal connector 43 with a terminal screw 44 which is mounted in a suitable aperture in the head 14 and which projects toward the side opposite to the viewer of Fig. 1. A suitable resistor 49 is interposed in connector 43. A second terminal post or screw 45 is mounted in the head 14 and projects outwardly through the wall of the head 14, this being partially illustrated at the upper left of Fig. 1. Said terminal post 45 is electrically connected to the metal reflector whose central portion forms the bulb socket 18, by means of a circuit wire or bar 46 which has a voltage resistor 47 of the desired size interposed therein.

Cables 33 and 34 are adapted to be removably connected to the outer end portions (not shown) of the terminal posts 44 and 45, after removal from posts 31 and 32, and when so connected the exposed end portions of the cables are adapted to be contacted to a live circuit at spaced apart points which will effect illumination of the bulb 19a to varying degrees because of aforesaid resistor 47. By use of this device in testing circuits of a wide voltage range, i. e. from 50 to 500 volts, the user will notice and easily memorize the different intensities of the bulb 19a when the current partially passes therethrough and such user will from time to time be able to judge the approximate voltage of a circuit or section of a circuit being tested.

Where desired suitable means, i. e. baffle or partition element, illustrated by 48 in Fig. 3 of nonconductive material may be mounted within the casing head so as to separate the interior parts of the voltage tester circuit from the remaining other parts herein described.

As many changes could be made in the above construction, and many apparently widely different embodiments of my invention, within the scope of the claim, constructed without departing from the spirit or scope thereof, it is intended that all matter contained in the accompanying specification shall be interpreted as illustrative and not in a limiting sense.

I claim:

An electrical circuit testing device comprising a casing, at least one battery cell within said casing, a pair of terminals mounted on said casing, electrical conductor means connecting the first of said terminals to a terminal of said battery cell, a lamp bulb mounted on said casing, an electrical conductor connecting a terminal of said lamp to the second of said pair of terminals, the other terminal of said lamp being in electrical circuit with the other terminal of said battery, means for selectively electrically connecting said pair of terminals to complete a circuit through said lamp whereby to energize said lamp at a known voltage, a second pair of terminals mounted on said casing, a second lamp bulb mounted on said casing, a conductor, including a resistance element of predetermined value connecting each of said pair of terminals, respectively, to a terminal of said second lamp bulb, a cable conductor connected to each of said second pair of terminals and adapted to be selectively connected into an external electrical circuit to be tested so as to energize said second lamp, the comparative intensities of illumination of said lamps indicating substantially the relative voltage in the circuit being tested.

FRANK MARINELLO.

REFERENCES CITED

The following references are of record in the file of this patent:

UNITED STATES PATENTS

| Number | Name | Date |
| --- | --- | --- |
| 925,412 | Addie | June 15, 1909 |
| 1,528,709 | Trimble | Mar. 3, 1925 |
| 1,631,213 | Latour | June 7, 1927 |
| 1,852,190 | Roe | Apr. 5, 1932 |
| 1,886,489 | Ludwig | Nov. 8, 1932 |
| 2,038,277 | Gent | Apr. 21, 1936 |
| 2,156,319 | Steele | May 2, 1939 |
| 2,231,660 | Carlotti et al. | Feb. 11, 1941 |
| 2,302,248 | Olson | Nov. 17, 1942 |